(12) United States Patent
Lange et al.

(10) Patent No.: US 7,149,400 B2
(45) Date of Patent: Dec. 12, 2006

(54) FERRULE ASSEMBLY FOR OPTICAL FIBRES

(75) Inventors: Ludwig Gerardus Martinus Antonius Lange, Vinkel (NL); Henrikus Petrus Gijsbertus Van Der Steen, Den Dungen (NL)

(73) Assignee: FCI, Versaille (FR)

( * ) Notice: Subject to any disclaimer, the term of this patent is extended or adjusted under 35 U.S.C. 154(b) by 0 days.

(21) Appl. No.: 10/917,644

(22) Filed: Aug. 13, 2004

(65) Prior Publication Data

US 2005/0069265 A1    Mar. 31, 2005

(30) Foreign Application Priority Data

Aug. 14, 2003  (NL)  .................................... 1024109

(51) Int. Cl.
*G02B 6/00*   (2006.01)

(52) U.S. Cl. ............................ 385/137; 385/60; 385/72

(58) Field of Classification Search ................. 385/60, 385/72, 134–137; 361/728–745, 752–759; 378/119–123
See application file for complete search history.

(56) References Cited

U.S. PATENT DOCUMENTS

| | | | |
|---|---|---|---|
| 5,671,311 A | 9/1997 | Stillie et al. | 385/89 |
| 5,920,665 A | 7/1999 | Presby | 385/16 |
| 6,442,306 B1 | 8/2002 | Dautartas et al. | 385/15 |
| 6,658,088 B1* | 12/2003 | Tiren | 378/119 |
| 2001/0055460 A1 | 12/2001 | Steinberg | 385/137 |
| 2003/0002806 A1 | 1/2003 | Kang et al. | 385/60 |
| 2003/0123835 A1 | 7/2003 | Moran | 385/137 |
| 2003/0142909 A1 | 7/2003 | Suzuki et al. | 385/33 |
| 2004/0190851 A1* | 9/2004 | Garner et al. | 385/137 |

FOREIGN PATENT DOCUMENTS

| | | |
|---|---|---|
| DE | 199 04 445 A1 | 8/2000 |
| EP | 1 271 208 A1 | 1/2003 |

* cited by examiner

*Primary Examiner*—Phan Palmer
(74) *Attorney, Agent, or Firm*—Harrington & Smith, LLP

(57) ABSTRACT

The invention relates to a ferrule assembly for optical fibres comprising a high-density ferrule plate with a two-dimensional array of through-holes for said optical fibres. The holes of the ferrule plate comprise substantially straight edges adapted to substantially contain said optical fibres. The invention further relates to a method for manufacturing a high-density ferrule plate, a mould for die casting such a high-density ferrule plate and a method for manufacturing such a mould.

17 Claims, 8 Drawing Sheets

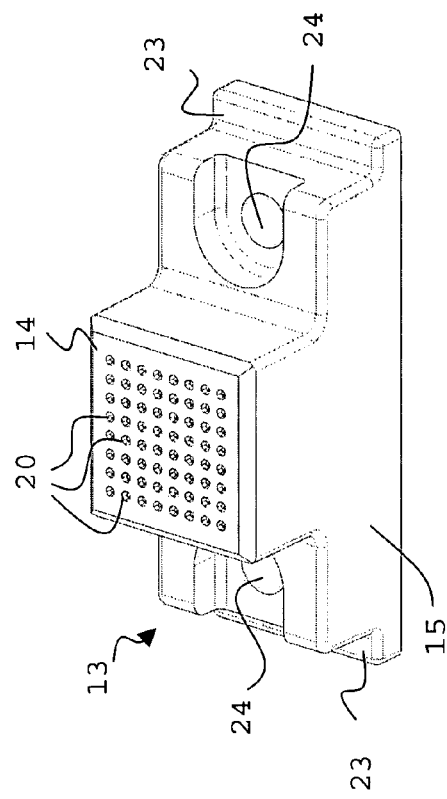
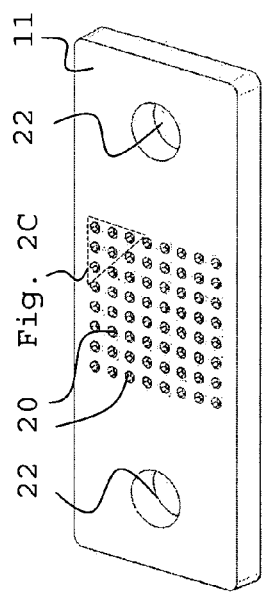
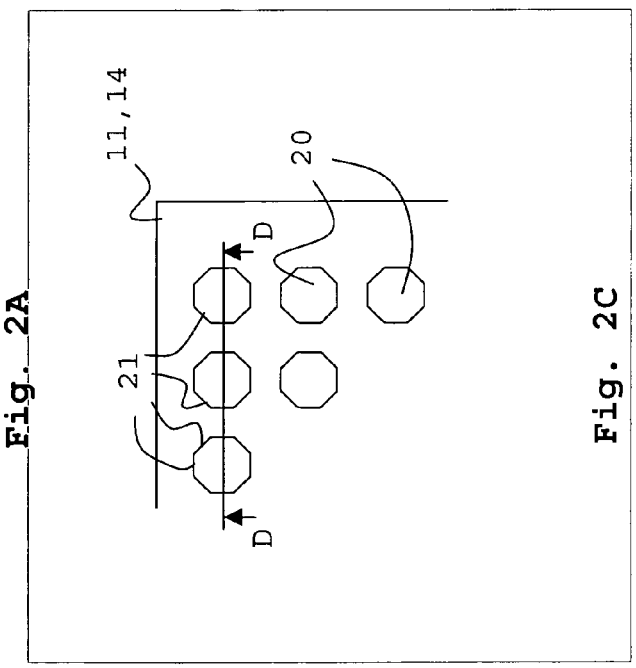
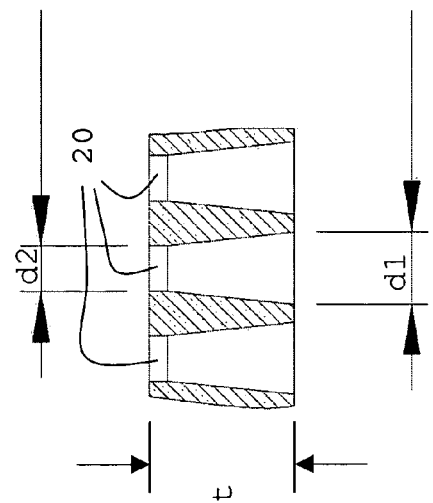

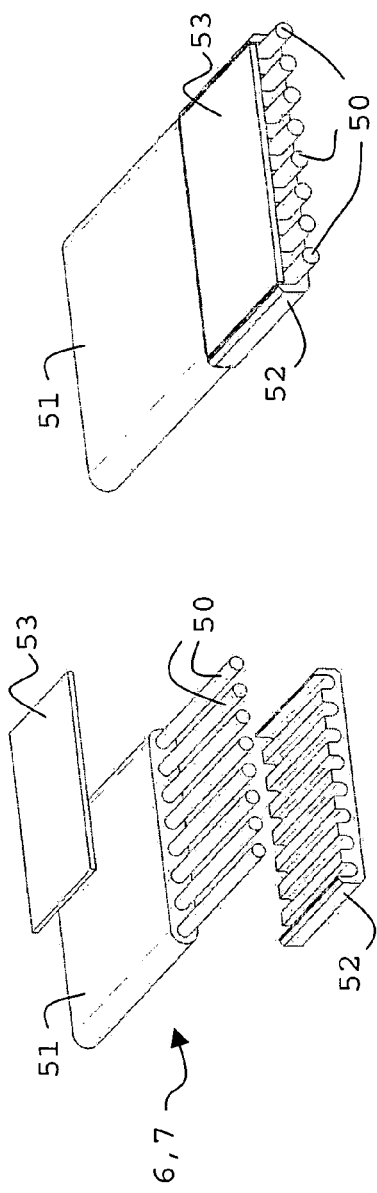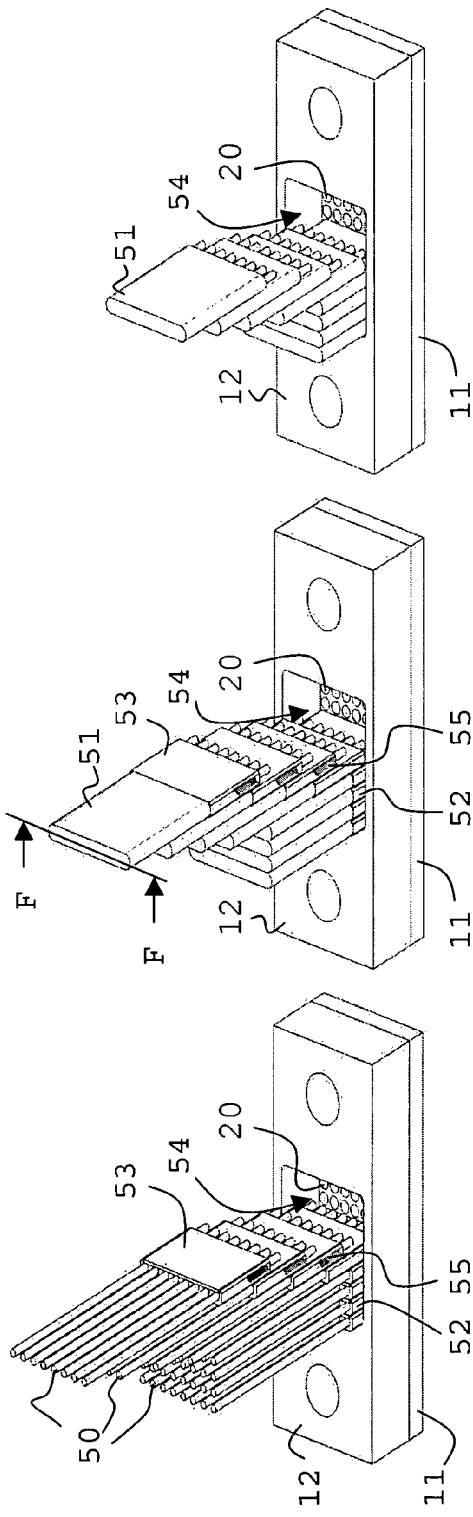

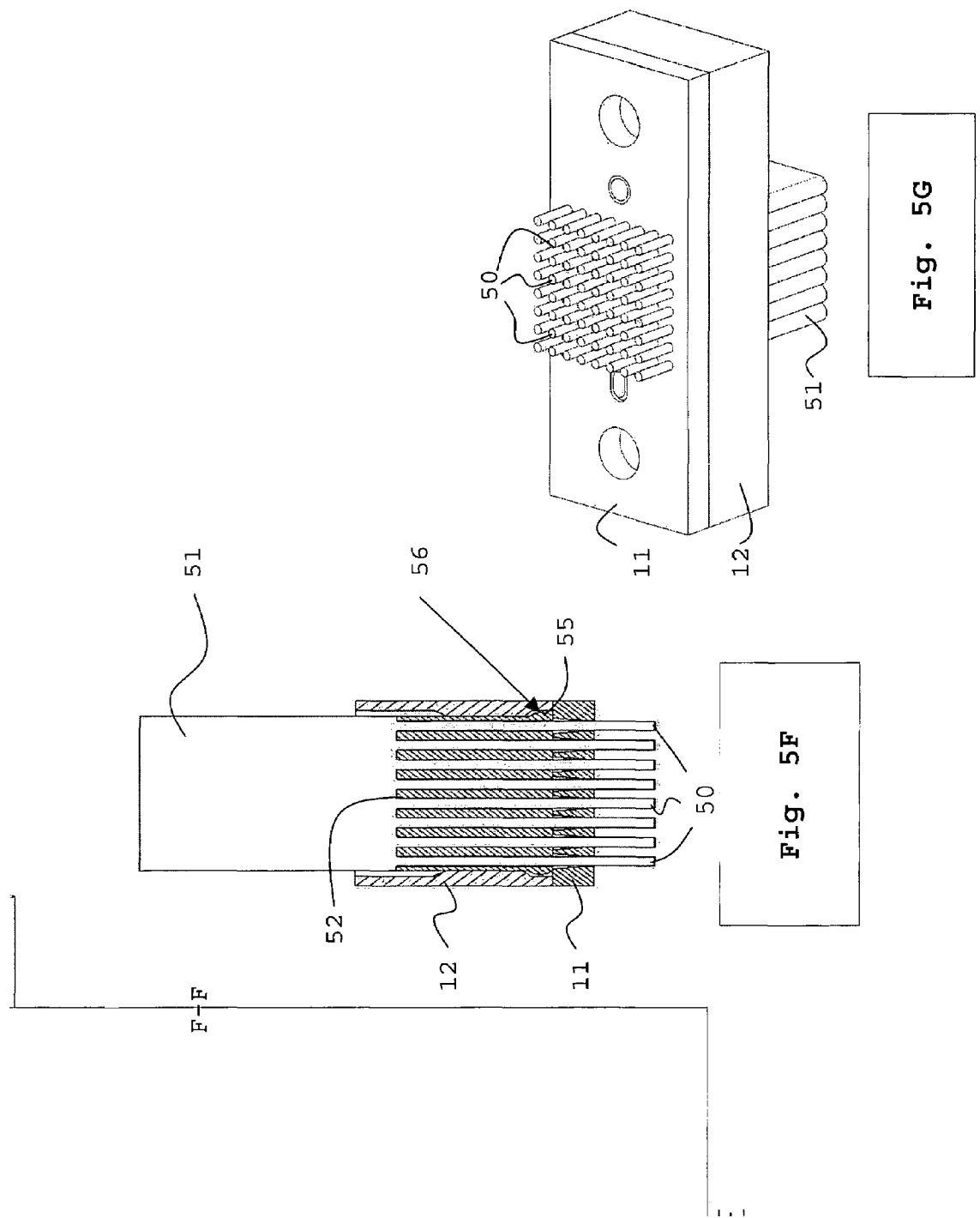

FERRULE ASSEMBLY FOR OPTICAL FIBRES

FIELD OF THE INVENTION

The invention relates to a ferrule assembly for optical fibres comprising a high-density ferrule plate with a two-dimensional array of through-holes for said optical fibres.

BACKGROUND OF THE INVENTION

WO 03/003064 discloses a multi-piece fibre optic component to accurately hold an optical fibre within a commercial type connector. The component comprises a first high precision slice with multiple holes and a second high precision slice with multiple holes. The holes of both pieces have a substantially circular or oval cross section and are aligned by alignment openings such that the holes are offset relative to each other to define an opening having an area less than that of the openings of either slice. The slices preferably are stacks of silicon wafers and the holes are preferably manufactured by anisotropic etching.

The fibre optic component of the prior art is disadvantageous in that manufacturing of these components is difficult and time-consuming. Especially the substantially circular or oval cross section needs to be very accurate for adequate fixation of the optical fibres.

SUMMARY OF THE INVENTION

It is an object of the invention to provide a ferrule assembly and a manufacturing method for a high-density ferrule plate of such an assembly that is easier and less expensive to manufacture while keeping the required accuracy in holding the optical fibres.

This object is achieved by providing a ferrule assembly characterized in that said holes of said ferrule plate comprise substantially straight edges adapted to substantially contain said optical fibres. The shapes of these holes enable to combine adequate fixation or delimitation of the optical fibres with ease of manufacturing of these holes. Preferably the holes have a substantially the shape of a regular polygon, such as an octagon. The edges of such an octagonal hole have been found to adequately contain and/or fixate the optical fibres even for a high density two-dimensional array of such holes in the ferrule plate. Such a two-dimensional array of holes may e.g. comprise 8×8, 16×16, 32×32 or even 64×64 holes or larger in the ferrule plate. It is noted here that the substantial straightness of the edges of said holes is meant to include edges that comprise negligible deviations from linearity in comparison to the dimensions of the optical fibres. Further it should be appreciated that the holes shaped according to the invention may not entirely fixate the optical fibres but substantially contain said fibres such that movement of the cable does not significantly disturb the optical signal, at least not for multi-mode fibres.

In an embodiment of the invention the holes in the ferrule plate are tapered through holes to facilitate insertion of the fibres.

In an embodiment of the invention the ferrule plate is a ceramic ferrule plate or, alternatively it is made of a material having the same thermal expansion coefficient as the board that embeds the device or the substrate material of the embedded device. Ceramic ferrule plates are advantageous in that such plates have a low to ultra-low thermal expansion coefficient thereby reducing misalignment of the contained optical fibres with a device as a result of temperature variations. In the alternative embodiment the equal thermal expansion of both the board and the ferrule plate prevents misalignment as well.

In an embodiment of the invention the ferrule assembly comprises three alignment elements, positioned to control alignment from the centre of said two-dimensional array of through-holes. Such an alignment configuration is especially advantageous for large arrays, e.g. exceeding 8×8 to control mismatches between the optical fibres and e.g. an optical chip embedded in a circuit board as a result of differences in the thermal expansion coefficient. The alignment configuration thus prevents considerable distortions of the optical signal.

In an embodiment of the invention the assembly comprises a ferrule holder with at least one cavity for receiving said optical fibres. Such a cavity may e.g. be used to hold the ribbon cables comprising the optical fibres. Preferably the assembly has an integrated ferrule plate and ferrule holder. In such an assembly the ferrule holder may support the ferrule plate in close proximity to e.g. an embedded optical chip such that optical components as optical lenses can be omitted for transmission of the optical signals between the optical chip and the optical fibres. Alternatively the ferrule holder and the ferrule plate are modular parts of the assembly facilitating manufacturing of the parts.

In an embodiment of the invention the cavity of the ferrule holder comprises a locking structure adapted to cooperate with a corresponding element on a fibre holder assembly holding said optical fibres. Such a locking arrangement facilitates assemblage of the optical cables to the ferrule assembly. The locking arrangement e.g. comprises a snapping element on the fibre holder assembly that snaps into a corresponding recess in the ferrule holder.

The invention also relates to a ferrule plate for use in a ferrule assembly as described above.

The invention further relates to a method for manufacturing a high-density ferrule plate with a two-dimensional array of through-holes with substantially straight edges for containing optical fibres, comprising the steps of:

providing a mould comprising a portion with a two-dimensional array of protrusions, said protrusions comprising substantially straight edges;

die casting or otherwise moulding said high-density ferrule plate by filling said mould with a ceramic material.

This method of manufacturing is more simple and less time-consuming than the prior art etching method and additionally more accurate than laser drilling. The moulding method allows the protrusions of the mould to shape the through-holes in the ferrule plate with octagonal edges and preferably also in a tapered fashion in the axial direction.

Moreover the invention relates to a mould for die casting a high-density ferrule plate with a two-dimensional array of through-holes for holding optical fibres wherein at least a mould portion comprises a two-dimensional array of protrusions with substantially straight edges. Such a mould may be used for moulding the ferrule assembly as described above. Preferably the protrusions of the mould each comprise at least one straight edge and more preferably each have multiple straight edges to provided e.g. an octagonal shape for the holes of the ferrule plate to be manufactured.

Finally the invention also relates to a method for manufacturing a mould for die-casting a high-density ferrule plate comprising a two-dimensional array of through-holes with substantially straight edges for holding optical fibres, comprising the steps of:

providing a metallic mould;

wire sparking, e.g. by electrical discharge machining (EDM), at least a portion of said metallic mould to obtain protrusions adapted to obtain said substantially straight edges for said through-holes.

The wire sparked protrusions enable a moulding manufacturing process for a high density ferrule plate wherein the accuracy of the shapes of the holes is sufficient for the intended purposes. Preferably the protrusions substantially determine a x-y plane with a normal in the z-direction and said wire sparking operation is performed the x-direction, the y-direction and in the directions of a first and second diagonal in said x-y plane. In this way a mould part is obtained for moulding a ferrule part with high density holes having octagonal-edges by wire sparking the metallic mould portion in only four directions.

BRIEF DESCRIPTION OF THE DRAWINGS

The invention will be further illustrated with reference to the attached drawings, which shows a preferred embodiment according to the invention. It will be understood that the invention is not in any way restricted to this specific and preferred embodiment.

FIGS. 2A–2D show two ferrule assemblies according to an embodiment of the invention;

FIGS. 5A–5G show various steps of a method for assembling a plurality of optical cables to a ferrule assembly;

DETAILED DESCRIPTION OF THE INVENTION

Figure 1:
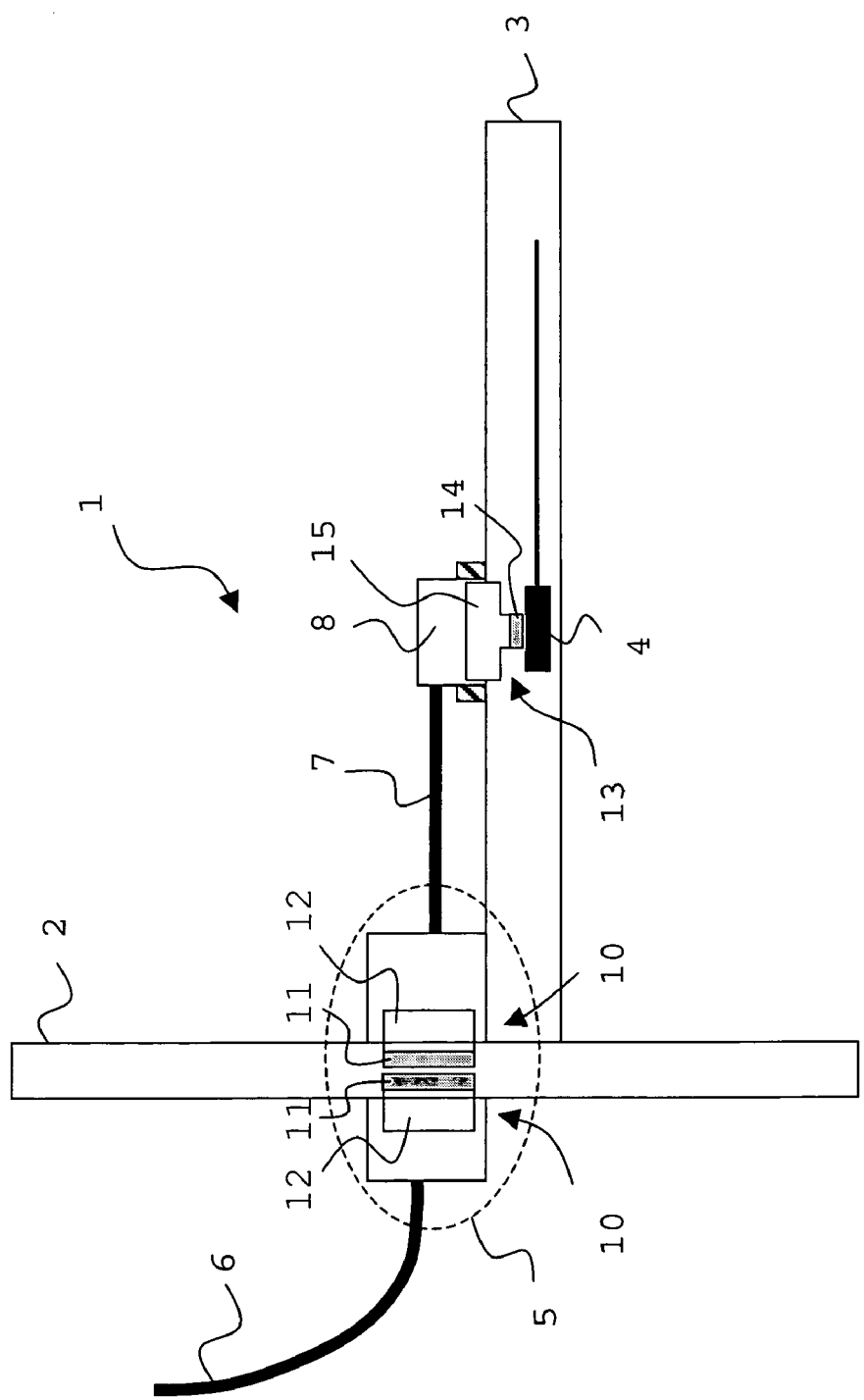
FIG. 1 shows a schematical illustration of an optical backpanel system.

In FIG. 1 an optical system 1 is shown comprising a backpanel 2 and a system card 3 with an embedded device 4. The embedded device 4 may e.g. be an active optical or electro-optical component, such as a combination of a vertical cavity surface emitting laser (VCSEL) and a sensor, or a passive component such as a mirror or one or more embedded optical waveguides. A connector assembly 5 optically connects a plurality of optical cables 6 via the off-board optical cables 7 to a surface mounted board connector 8. The optical cables 6, 7 may comprise a plurality of ribbon cables (shown in FIG. 5) each of said cables comprising a plurality of optical fibres (shown in FIG. 5). Optical signals may be transferred over those optical fibres to or from the device 4. The device 4 is embedded in the system card or PCB 3 and connected to other components (not shown) via waveguide 9.

At the backpanel 2 the connector assembly 5 comprises ferrule assemblies each having a ferrule plate 11 and a ferrule holder 12. Moreover the board connector 8 accommodates a further ferrule assembly 13 comprising a ferrule plate 14 and a ferrule holder 15. The ferrule assemblies 10, 13 will be discussed below in further detail.

Figure 6B:
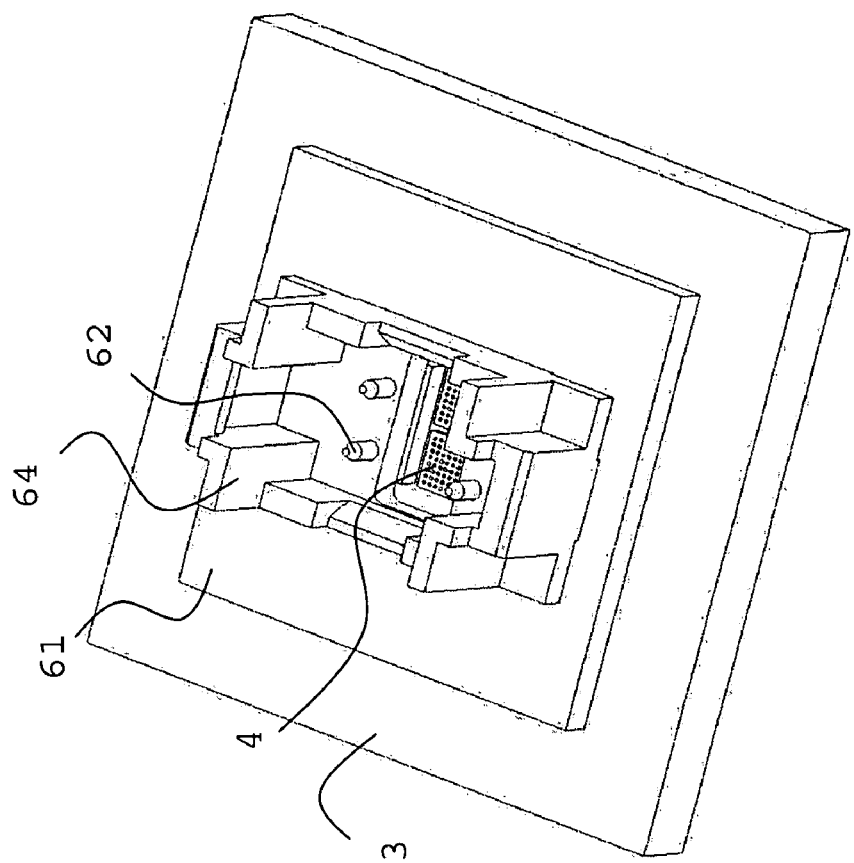
FIGS. 6A and 6B show a system card comprising an embedded device.

FIGS. 2A–2D and FIG. 3 show various aspects of the ferrule assemblies 10 and 13. The ferrule plates 11, 14 are formed of e.g. a high-density ceramic material with a two-dimensional array of through-holes 20 for individual optical fibres. The holes 20 comprise substantially straight edges 21, as most clearly visible in FIG. 2C. Preferably the edges 21 of the holes 20 have an octagonal shape, as shown in FIG. 2C. The ferrule plates 11, 14 are thin, e.g. in a range of t=0.3–0.5 mm, allowing the provision of a large amount of substantially parallel through-holes 20 per unit area. Moreover the holes 20 preferably are tapered, i.e. the dimension d1 at the entrance side for the fibres is larger than the dimension d2 at the fibres stopping side. The dimension d2 is e.g. in the range of 125–128 micron, such as 127 micron, while the pitch, i.e. the distance between adjacent holes 20, is e.g. in the range of 0,15–0,30 mm, e.g. 0,25 mm or 0,2 mm. Such a configuration enables a low loss connection between a large two-dimensional array of optical fibres and a counter-array or device, at least for multimode signals. The ferrule assembly 10 further includes alignment holes 22. The ferrule holder 15 further comprises support structures 23 for holding the ferrule assembly 13 in an optical board connector (see FIGS. 7A and 7B) and locating holes 24 for receiving alignment pins 62 (FIG. 6B).

Figure 3:
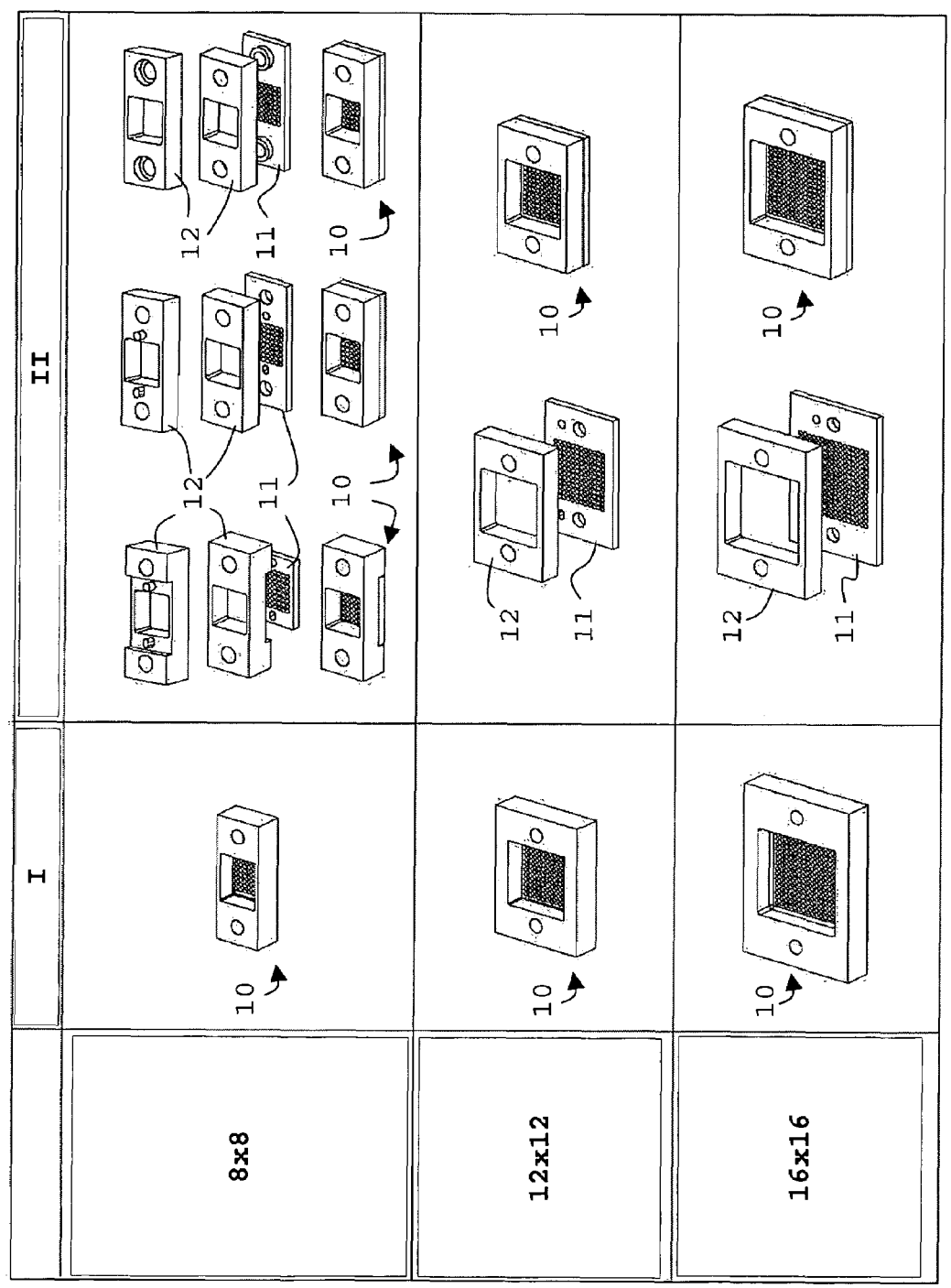
FIG. 3 shows one-piece and two-piece ferrule assemblies for various two-dimensional array sizes.

FIG. 3 shows a variety of embodiments of the ferrule assembly 10 for 8×8, 12×12 and 16×16 (rows) two-dimensional arrays of holes 20 for both one-piece ferrule assemblies 10 (column I) and two-piece or modular ferrule assemblies 10 (column II). It should be appreciated that larger array sizes are possible as well, such as 20×20, 32×32, 64×64 and larger. It should further be appreciated that the two-dimensional arrays are not necessarily have equal dimensions in both directions. The modular ferrule assemblies 10 of column II provide the advantage that the ferrule plates 11 can be manufactured in a less complex manner. As illustrated for the 8×8 array, the ferrule plates 11 and the ferrule holder 12 of the modular ferrule assemblies 10 can be attached to each other in a variety of ways. It should be appreciated that other ways of attachment fall within the scope of the present invention.

Figures 4A, 4B:
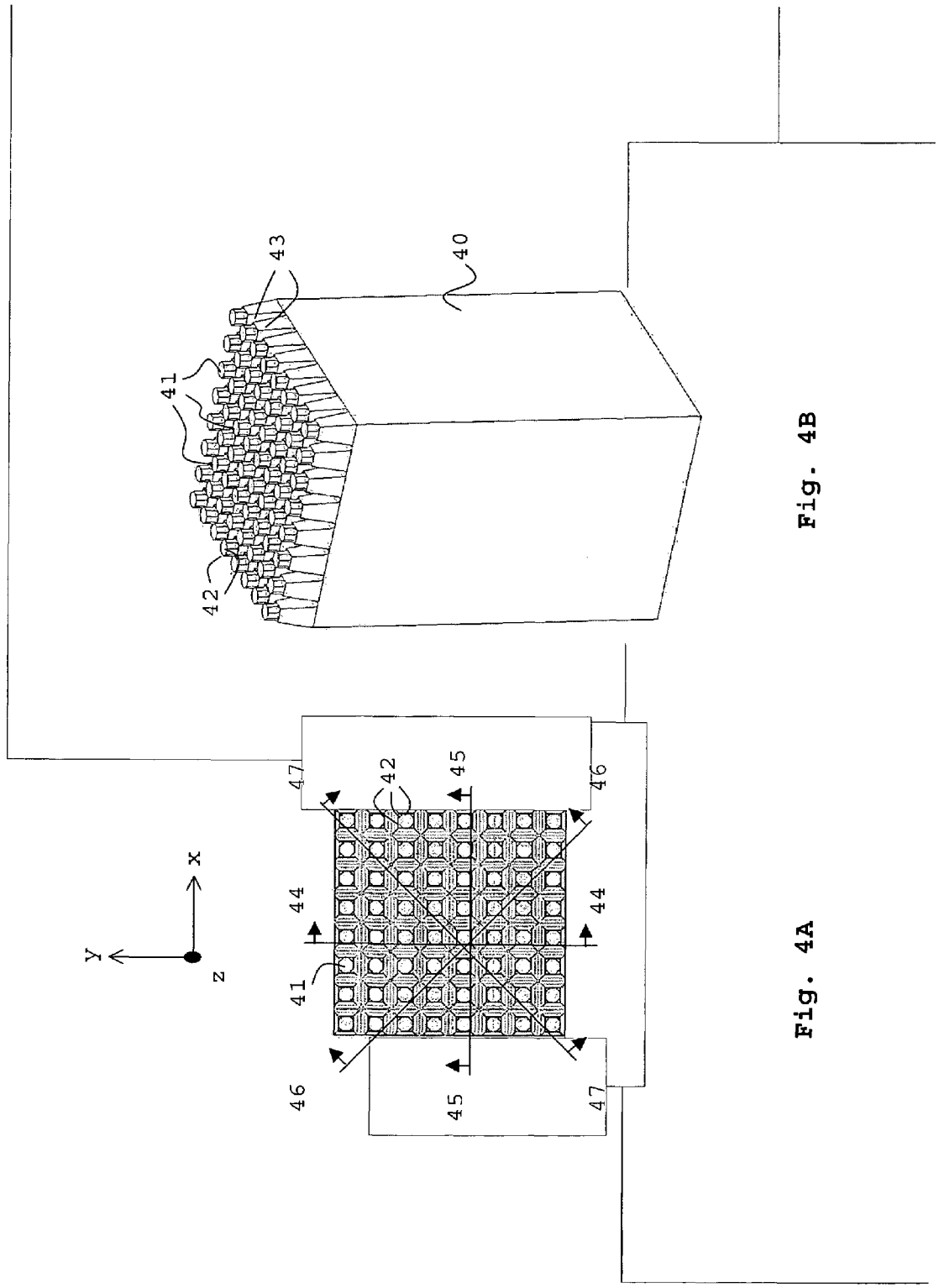
FIGS. 4A and 4B show different views of a mould portion for manufacturing a ferrule plate according to an embodiment of the invention.

FIGS. 4A and 4B show a top view and a three-dimensional view of a steel, e.g. stainless steel, portion 40 of a mould for forming the high-density ferrule plates 11, 14 comprising the two-dimensional arrays of through-holes 20 with substantially straight edges 21. These holes are formed in the ferrule plates 11, 14 by the protrusions 41. The protrusions 41 preferably determine an x-y plane, shown in FIG. 4A, whereof the edges 42 looking normal to this x-y plane show the octagonal shape of the through-holes 20 of FIG. 2C. A further part 43 of the protrusions 41 is shaped as to form the tapered shape of the through-holes 20.

The protrusions 41 of the metallic mould portion 40 are preferably manufactured by wire sparking (EDM). The octagonal shape of the protrusions 41 proves to be advantageous in that the wire sparking operation can be performed in the x-direction 44, the y-direction 45 and in the directions of a first diagonal 46 and a second diagonal 47 in the x-y plane to manufacture the protrusions. The mould portion 40 may be part of a larger mould for moulding the ferrule assemblies 10, 13 as one piece.

FIGS. 5A–5G show various steps of a method for assembling a plurality of optical cables to a ferrule assembly. FIG. 5A shows a ribbon cable 6, 7 having a plurality of optical fibres 50 and a ribbon 51. The fibres 50 preferably are polymer optical fibres (POF) 50, which is e.g. advantageous as such fibres 50 can be bend more severely as compared to glass optical fibres, typically by a factor 10. Polymer optical fibres typically have a diameter of 125 microns (core 50, cladding 75 microns). FIG. 5A further shows a fibre holder comprising a grooved first plate 52 and a flat second plate 53 to accurately determine the pitch between the optical fibres 50. This pitch preferably matches the pitch of the through-holes 20 of the two-dimensional array in the ferrule plates 11, 14. The grooves of the plate 52 are preferably conically shaped to facilitate row assembly of the optical fibres 50. FIG. 5B shows the ribbon cable 6, 7 and the fibre holder in an assembled state. The terminals of the optical fibres 50 may be cut and/or polished.

POF cables 6, 7 exist in various types and with several degrees of accuracies for e.g. the pitch of the optical fibres 50. FIGS. 5C–5E show attachments of various types of POF-cables 6, 7 to the ferrule assembly 10 as discussed previously. The ferrule assembly 10 comprises a cavity 54 in the ferrule holder 12 for receiving the optical fibres 50. It is noted that similar forms of attachment are envisaged for the ferrule assembly 13 and further that other attachment embodiments than shown in FIGS. 5C–5E fall within the scope of the present invention.

In FIG. 5C the cable 6, 7, e.g. a POF cable, does not have a ribbon 51, such that the pitch of the optical fibres 50 is fully determined by the first and second plates 52, 53. In FIG. 5D the pitch of the optical fibres 50 is preset by the ribbon 51 and more accurately determined by the plates 52 and 53. In inserting the subsequent cables 6, 7, preferably from the wide-tapered side indicated by d1 in FIG. 2D, the plates 52, 53 are positioned next to each other such that the optical fibres 50 enter the through holes 20 of the ferrule plate 11. The plates 52, 53 may be structured to assist in the insertion operation of a subsequent cable. In FIG. 5E the pitch of the optical fibre is accurately determined by the ribbon 51 of the particular POF-cable 6, 7 such that the plates 52, 53 can be omitted. After positioning of the cables 6, 7 the cavity 54 may be filled with a potting material, such as epoxy, to hold the cables in place.

Further the plate 52 is provided with a locking element 55 adapted to cooperate with a locking structure 56 in the cavity 54, as shown in FIG. 5F in cross section for a ribbon cable 6, 7 of FIG. 5D.

FIG. 5G displays a fully connectorized POF-cable assembly as viewed from the side of the ferrule plate 11. Clearly the optical fibres 50 are shown to have been inserted in the various octagonal through-holes 20 of the two-dimensional array. The length of the extension of the fibres 50 from the surface of the ferrule plate 11 is controlled by a polishing or cutting operation.

Figure 6A:
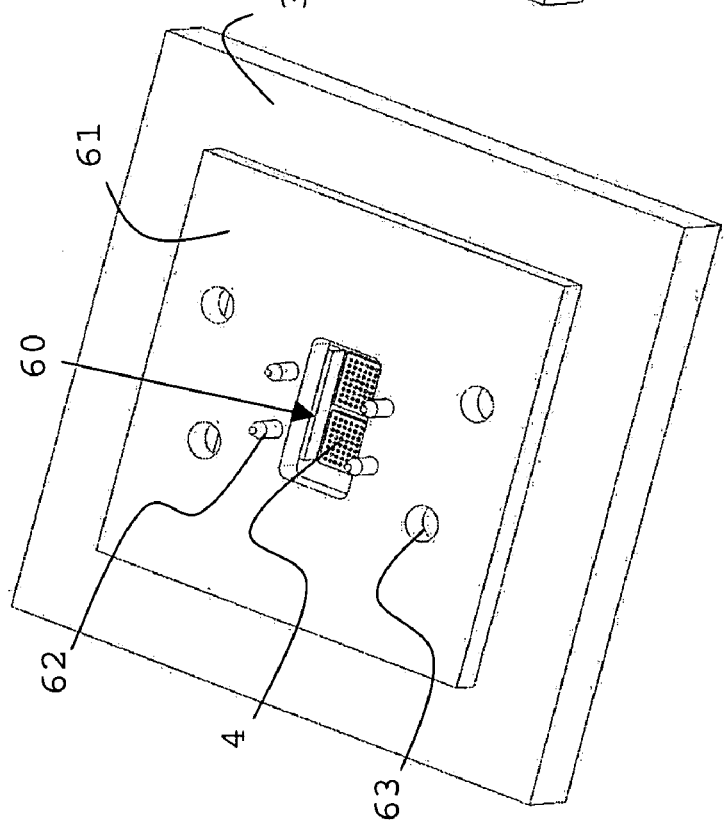

FIGS. 6A and 6B show a system card 3 comprising an embedded device 4. The device 4 is exposed by a cavity 60 in the PCB 3. The PCB 3 is covered by a plate 61, e.g. a ceramic plate, that is provided with a hole substantially matching the size of the cavity 60. The plate 61 comprises alignment pins 62 for aligning an optical board connector. This alignment system is the subject of a co-pending patent application ("Optical alignment system") of the applicant filed at the same date and is inserted herewith by reference with respect to this alignment operation. The alignment preferably involves the use of three alignment pins 62, positioned to control the alignment from the centre of the two-dimensional array of holes 20. Such a configuration of the alignment pins 62 is preferably advantageous for arrays larger than 8×8 holes. Misalignment may e.g. result from differences in thermal expansion coefficients of the ferrule assembly 13 and the PCB 3. The plate 61 further comprises positioning elements 63 for positioning a housing 64 for the device 4.

Figures 7A, 7B:
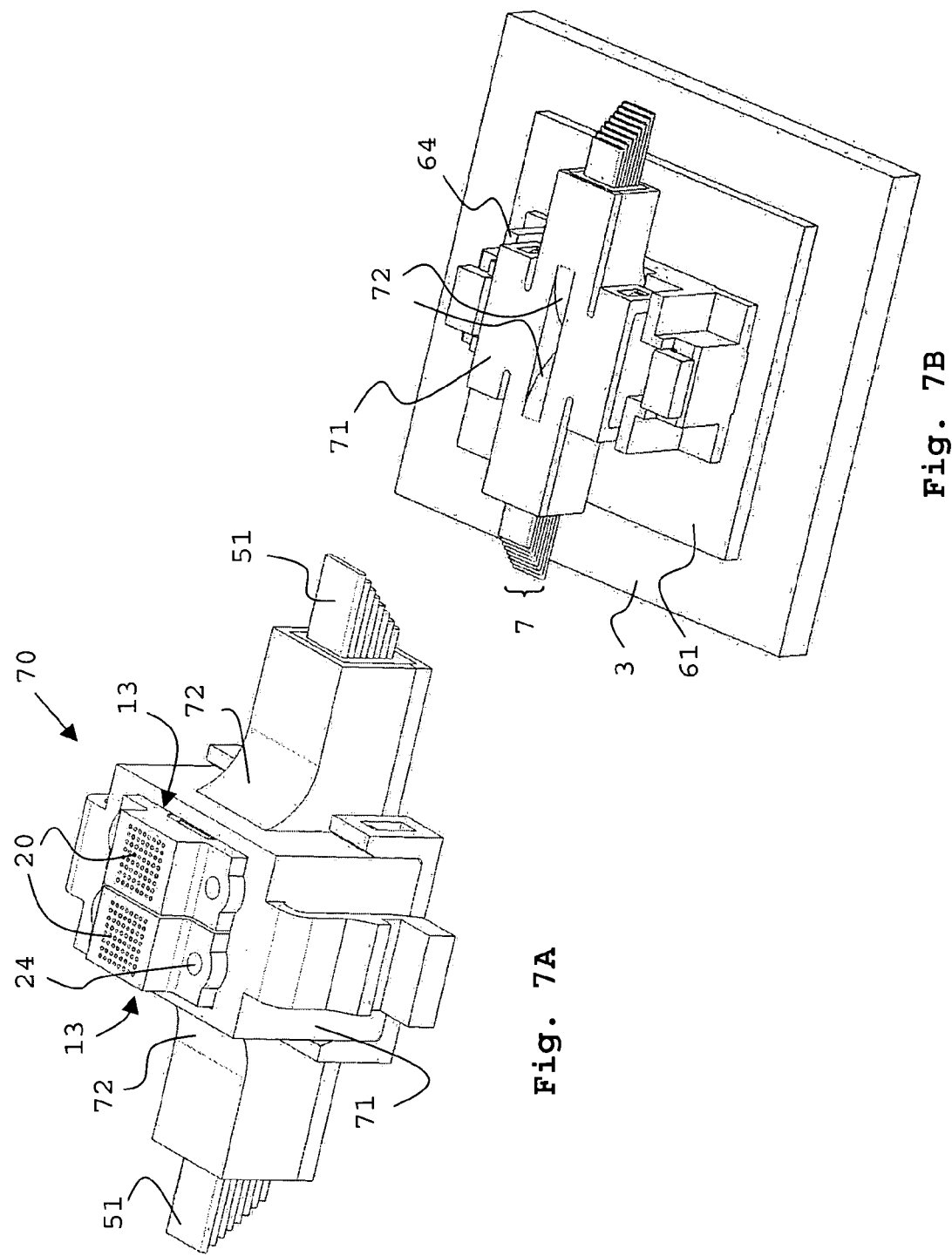
FIGS. 7A and 7B show an optical board connector comprising a ferrule assembly according to an embodiment of the invention.

FIG. 7A displays an optical board connector 70 comprising a board connector housing 71 containing two ferrule assemblies 13 as described above. The board connector housing 71 has two entrances for POF optical cables 7 that comprise a plurality of ribbon cables 51 with optical fibres 50. The housing 71 further comprises curved sections 72 that may exhibit small radii as the POF fibres 50 allow severe bending. The curvature may e.g. be 2 mm. These small radii allow the housing 71 to have a small height above the PCB 3, such that subsequent PCB's 3 may be positioned at a closer distance on the backpanel 2.

Finally FIG. 7B shows the optical board connector 70 positioned on the PCB 3, such that the ferrule assemblies 13, or at least their ferrule plates 14 enter the cavity 60 to position the terminal ends of the optical fibres 50 in close proximity to the device 4. The exact control of the distance between the ferrule plate 14 and the device 4 is the subject of a co-pending patent application ("Optical board connector assembly") of the applicant filed at the same date and is inserted herewith by reference. The step-like shape of the ferrule holder 15 enables the board connector housing 71 to hold the assembly 13, while the ferrule plate 14 approaches the embedded device 4. The optical fibres 50 are aligned with the appropriate positions of the device 4 by cooperation of the alignment pins 62 and the alignment holes 24 on the ferrule assembly 13.

The invention claimed is:

1. Ferrule assembly for optical fibres having circular cross-section comprising a high-density ferrule plate with a two-dimensional array of through-holes for said optical fibres characterized in that said holes of said ferrule plate comprise substantially straight edges adapted to substantially contain said optical fibres.

2. Ferrule assembly according to claim 1, wherein said assembly comprises a ferrule holder with at least one cavity for receiving said optical fibres.

3. Ferrule assembly according to claim 2, wherein said ferrule plate and ferrule holder are integrated and said ferrule holder comprises structures for supporting said assembly.

4. Ferrule assembly according to claim 2, wherein said cavity comprises a locking structure adapted to cooperate with a corresponding element on a fibre holder assembly holding said optical fibres.

5. Ferrule assembly according to claim 1, wherein said holes have substantially the shape of a polygon.

6. Ferrule assembly according to claim 5, wherein said holes have a substantially octagonal shape.

7. Ferrule assembly according to claim 1, wherein said holes are tapered through-holes.

8. Ferrule assembly according to claim 1, wherein said ferrule plate is a ceramic ferrule plate or is made of a material with the same thermal expansion coefficient as a board to which said ferrule assembly is applied or a substrate of a device embedded in said board.

9. Ferrule assembly according to claim 1, wherein said ferrule plate and said ferrule holder are modular parts of said assembly.

10. Ferrule assembly according to claim 1, wherein said ferrule assembly comprises three alignment elements, positioned to control alignment from the centre of said two-dimensional array of through-holes.

11. Ferrule plate for use in a ferrule assembly according to claim 1.

12. Ferrule assembly according to claim 1, wherein said holes have a polygonal cross section and the holes are tapered.

13. Method for manufacturing a high-density ferrule plate with a two-dimensional array of through-holes with substantially straight edges for containing optical fibres, comprising the steps of:
providing a mould comprising a portion with a two-dimensional array of protrusions, said protrusions comprising substantially straight edges;
die casting said high-density ferrule plate by filling said mould with a ceramic material.

14. A method as in claim 13 wherein die casting said high-density ferrule plate comprises forming polygonal cross section holes around said straight edges of said protrusions.

15. Method for manufacturing a mould for die-casting a high-density ferrule plate comprising a two-dimensional array of through-holes with substantially straight edges for holding optical fibres, comprising the steps of:
providing a metallic mould;
wire sparking at least a portion of said metallic mould to obtain protrusions adapted to obtain said substantially straight edges for said through-holes.

16. Method according to claim 15, wherein said protrusions substantially determine a x-y plane with a normal in the z-direction and said wire sparking operation is performed the x-direction, the y-direction and in the directions of a first and second diagonal in said x-y plane.

17. A method as in claim 15 wherein said through-holes are formed as tapered polygonal holes.

* * * * *